United States Patent
Sfarti et al.

(10) Patent No.: US 9,657,644 B2
(45) Date of Patent: May 23, 2017

(54) METHOD FOR MOUNTING AN ACOUSTIC PANEL IN A HOUSING OF A TURBOMACHINE AND TURBOMACHINE COMPRISING AN ACOUSTIC PANEL

(71) Applicant: SNECMA, Paris (FR)

(72) Inventors: François Sfarti, Paris (FR); François Marie Paul Marlin, Paris (FR)

(73) Assignee: SNECMA, Paris (FR)

( * ) Notice: Subject to any disclaimer, the term of this patent is extended or adjusted under 35 U.S.C. 154(b) by 254 days.

(21) Appl. No.: 14/426,936

(22) PCT Filed: Sep. 11, 2013

(86) PCT No.: PCT/FR2013/052085
§ 371 (c)(1),
(2) Date: Mar. 9, 2015

(87) PCT Pub. No.: WO2014/041297
PCT Pub. Date: Mar. 20, 2014

(65) Prior Publication Data
US 2015/0285151 A1    Oct. 8, 2015

(30) Foreign Application Priority Data
Sep. 12, 2012    (FR) ..................... 12 58548

(51) Int. Cl.
*F02C 7/24*  (2006.01)
*F02C 7/045*  (2006.01)
*F02K 1/82*  (2006.01)

(52) U.S. Cl.
CPC ............... *F02C 7/24* (2013.01); *F02C 7/045* (2013.01); *F02K 1/827* (2013.01); *Y02T 50/671* (2013.01)

(58) Field of Classification Search
CPC . F02C 7/24; F02C 7/045; F02K 1/827; Y02T 50/671
See application file for complete search history.

(56) References Cited

U.S. PATENT DOCUMENTS 5,594,216 A * 1/1997 Yasukawa ............... F02C 7/045
                                                        181/213
6,439,340 B1 * 8/2002 Shirvan ................. G10K 11/172
                                                        181/213

(Continued)

FOREIGN PATENT DOCUMENTS

GB    2 273 131 A    6/1994
GB    2 468 484 A    9/2010

(Continued)

OTHER PUBLICATIONS

International Search Report mailed Nov. 7, 2013, issued in corresponding International Application No. PCT/FR2013/052085, filed Sep. 11, 2013, 2 pages.

*Primary Examiner* — Igor Kershteyn
(74) *Attorney, Agent, or Firm* — Christensen O'Connor Johnson Kindness PLLC

(57) ABSTRACT

A method for mounting an acoustic panel on the inner surface of an annular housing of an axial turbomachine, the cylindrical acoustic panel comprising at least one longitudinal slot so as to define two opposing ends, the method comprising: bringing the two opposing ends closer together so as to reduce the cylinder radius of the acoustic panel; inserting the acoustic panel into the fan casing when the opposing ends are close together; deploying the opposing ends so as to increase the cylinder radius of the acoustic panel; and securing the acoustic panel to the housing by gluing.

9 Claims, 2 Drawing Sheets

(56) References Cited

U.S. PATENT DOCUMENTS

| | | | |
|---|---|---|---|
| 6,857,669 B2* | 2/2005 | Porte | B64D 29/00 285/368 |
| 8,640,825 B2 | 2/2014 | Vauchel | |
| 2001/0048048 A1* | 12/2001 | Riedel | G10K 11/16 244/53 B |
| 2012/0160933 A1 | 6/2012 | Vauchel | |

FOREIGN PATENT DOCUMENTS

| | | |
|---|---|---|
| WO | 2010/007263 A1 | 1/2010 |
| WO | 2011/027072 A1 | 3/2011 |

\* cited by examiner

METHOD FOR MOUNTING AN ACOUSTIC PANEL IN A HOUSING OF A TURBOMACHINE AND TURBOMACHINE COMPRISING AN ACOUSTIC PANEL

GENERAL TECHNICAL FIELD AND PRIOR ART

The present invention relates to the field of reducing the noise generated by a turbine engine and, more particularly, to attaching an acoustic panel to the inner surface of a casing of a turbine engine for aircraft.

Conventionally, a turbine engine for aircraft allows an air flow to accelerate axially upstream to downstream in order to generate a thrust for the aircraft on which the turbine engine is mounted. The terms "upstream" and "downstream" are hereinafter defined in relation to the direction in which the air flow circulates in the turbine engine. The terms "inner" and "outer" are hereinafter defined in relation to the axis of the turbine engine. A longitudinal cylinder thus comprises an inner surface which faces its axis and an outer surface which is opposite its inner surface.

A turbine engine comprises a rotary shaft which, at its upstream end, terminates in a fan so as to set said fan into rotation inside a fan casing of the turbine engine. In a twin-spool turbine engine, the fan is conventionally set into rotation by a shaft of the low-pressure spool.

With reference to FIG. 1, a fan casing 1 extends longitudinally along the axis of the turbine engine and has a generally annular cross section. In order to limit the noise generated by the rotation of the fan (not shown) in the fan casing 1, it is known to attach an acoustic panel 2 to the inner surface of the fan casing 1. A turbine engine of this type is, for example, known from the application FR 11/59105 filed by the company SNECMA.

An acoustic panel 2 conventionally comprises an outer layer which is composed of a honeycomb structure and an inner skin which is composed of stratified pleated glass. In order to make it easier for said acoustic panel to be mounted and attached to the fan casing 1, the acoustic panel 2 does not have an annular shape, but is divided into sectors. With reference to FIG. 1, the acoustic panel 2 comprises four acoustic modules 3A, 3B, 3C, 3D which fit together tangentially to form a circumferential annular acoustic panel 2. For this purpose, each acoustic module 3A, 3B, 3C, 3D comprises tangential linking means 41 at its lateral ends. Moreover, each acoustic module 3A, 3B, 3C, 3D is passed through radially by fixing screws 42 to make it possible for said modules to be attached radially to the fan casing 1 as shown in FIG. 1.

In practice, the tangential linking means 41 on the interfaces between the acoustic modules 3A, 3B, 3C, 3D and the fixing screws 42 generate noise when the turbine engine is in operation; given the fact that turbine engines have to comply with increasingly strict noise standards, this presents a disadvantage. Moreover, the use of fixing screws 4 increases the mass of the turbine engine, and this presents another disadvantage.

GENERAL DESCRIPTION OF THE INVENTION

In order to eliminate at least some of these disadvantages, the invention relates to a method for mounting a cylindrical acoustic panel on the inner surface of an annular casing of an axial turbine engine, the acoustic panel comprising at least one longitudinal slot so as to define two opposing ends, the method comprising the following steps:

a step of bringing the two opposing ends closer together so as to decrease the cylinder radius of the acoustic panel;

a step of inserting the acoustic panel into the fan casing when the opposing ends are close together;

a step of opening out the opposing ends so as to increase the cylinder radius of the acoustic panel; and a step of attaching the acoustic panel to the casing by gluing.

By means of the invention, it is possible to mount in the fan a cylindrical acoustic panel having a cylinder outer diameter which corresponds to the inner diameter of the casing. The longitudinal slot allows the acoustic panel to be mounted in the casing effortlessly and without the risk of it becoming damaged due to the smaller size of the acoustic panel, which results from the reduction in its cylinder radius when the opposing ends are close together. Moreover, the step of attaching by gluing allows the weight of the turbine engine to be reduced in comparison with the prior art, while improving the acoustic damping. The acoustic panel thus has a uniform inner surface.

Preferably, the method comprises a step of filling the slot using sealing means after the step of opening out the opposing ends. In this way, the longitudinal slot, which is used during the step of bringing the two opposing ends closer together, can be filled so that the acoustic panel allows acoustic damping which is consistent with its circumference.

Preferably, a second end of the acoustic panel comprises a tangential step and the first end of the acoustic panel extends outwardly towards said step when the opposing ends are close together.

Preferably, the acoustic panel comprises an outer layer which is composed of a honeycomb structure and an inner skin, the outer layers of the opposing ends of the acoustic panel being in contact with each other when the opposing ends are close together.

Thus, the first end is extended in place of the longitudinal slot so as to decrease the perimeter of the acoustic panel and, consequently, its cylinder radius. Moreover, it is advantageous that the first end of the acoustic panel extends outwardly towards the tangential step so as to allow the inner surface of the acoustic panel to remain continuous in the opened-out position. The inner surface of an acoustic panel is important because it forms the first means of damping the acoustic waves which are emitted by the turbine engine.

The invention also relates to an assembly of a casing of an axial turbine engine and of an acoustic panel which is glued to the inner surface of said casing, the acoustic panel comprising at least one longitudinal slot so as to define two opposing ends and comprising means of sealing the longitudinal slot, wherein a second end of the acoustic panel comprises a tangential step, the sealing means being arranged radially between said step and the inner surface of the casing.

More preferably, the acoustic panel comprises an outer layer which is composed of a honeycomb structure and an inner skin, the tangential step being formed in said inner skin. The tangential step is preferably formed of the inner skin. Thus, the inner skin remains continuous in the opened-out position and has the same properties, in particular the same thickness, in all the directions of propagation of the acoustic waves.

Preferably, the acoustic panel is an annular part, thereby allowing the acoustic damping to be optimised while limiting the number of interfaces which generate noise. Preferably, the annular acoustic panel comprises only a single longitudinal slot. Alternatively, the acoustic panel may be an angular sector.

According to a preferred aspect of the invention, the sealing means are in the form of an expanding foam.

DESCRIPTION OF THE DRAWINGS

The invention will be better understood upon reading the following description, which is given solely by way of example and with reference to the accompanying drawings, in which.

It should be noted that the drawings show the invention in detail in order for the invention to be carried out, said drawings, of course, being able to be used to better define the invention if required.

DESCRIPTION OF ONE OR MORE EMBODIMENTS

The following will describe how the invention can be used to mount an acoustic panel on the inner surface of a casing of a turbine engine for aircraft. In this example, with reference to FIGS. 2 and 3, the turbine engine comprises a fan casing 1 which extends longitudinally along the axis of the turbine engine and has a circular cross section with a predetermined inner radius R1. The fan casing 1 is capable of housing a fan which is rigidly connected to an axial shaft of the turbine engine (not shown).

Figure 3:
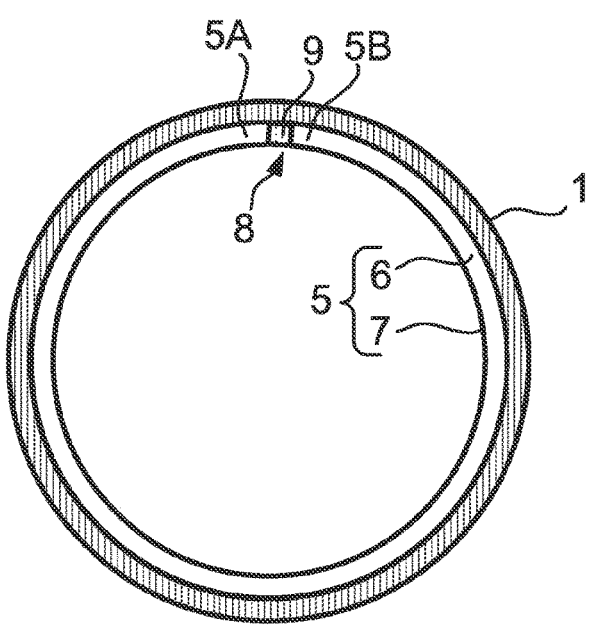
FIG. 3 is a cross-sectional schematic view of a fan casing in which an acoustic panel according to the invention is mounted when the opposing ends are opened out.

In order to limit the noise generated by the turbine engine, the inner surface of the fan casing 1 is covered by a cylindrical acoustic panel 5, which is formed in one piece, is annular in shape and extends longitudinally with respect to the axis of the turbine engine. An acoustic panel 5, which is formed in one piece, advantageously allows the noise generated to be reduced in comparison with an acoustic panel which comprises modules. As shown in FIG. 3, the outer radius of the acoustic panel 5 corresponds to the inner radius of the fan casing 1. There is thus no radial clearance between the fan casing 1 and the acoustic panel 5 when said acoustic panel is opened out as shown in FIG. 3.

With reference to FIGS. 2 to 6, the acoustic panel 5 comprises an outer layer 6 which is composed of a honeycomb structure and an inner skin 7 which, in this example, is composed of stratified pleats, preferably made from glass or carbon. The composition of an acoustic panel 5 of this type is known to a person skilled in the art and will not be described in more detail below. By way of example, the outer layer 6 has a radial thickness of approximately 35 mm, whereas the inner skin has a radial thickness of approximately 1 to 2 mm.

To make it possible for the acoustic panel 5 to be mounted as will be described below, said panel comprises at least one longitudinal slot 8 so as to define two opposing ends 5A, 5B as shown in FIGS. 2 to 6. Preferably, the acoustic panel 5 comprises a single longitudinal slot 8 so that it remains as efficient as possible.

Figure 4:
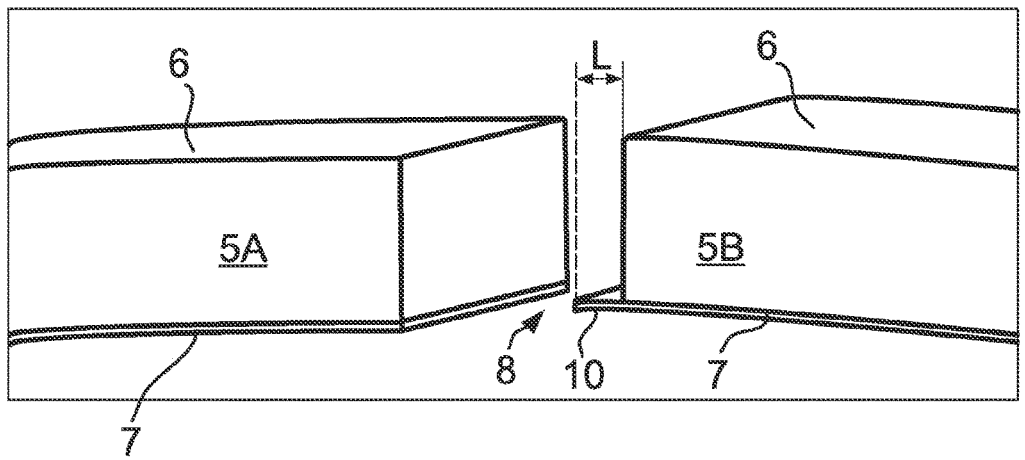
FIG. 4 is an enlarged schematic view of the ends of the acoustic panel, the ends being shown with a gap between them for the sake of clarity.
Figure 5:
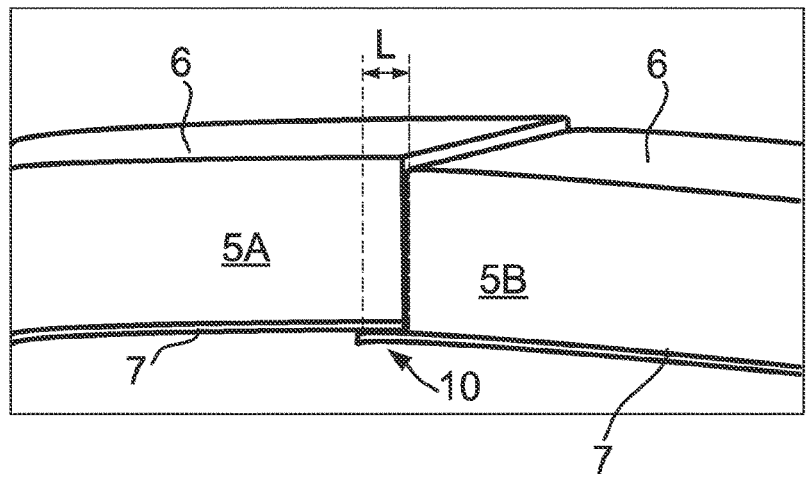
FIG. 5 is an enlarged schematic view of the ends of the acoustic panel when they are close together during mounting.

Referring more specifically to FIG. 4, the second end 5B of the acoustic panel 5 comprises a tangential step 10 which extends perpendicularly to an axial plane which passes through the second end 5B. Preferably, the tangential step 10 extends in a continuous manner into the inner skin 7 of the second end 5B. In this example, the tangential step 10 is formed of the inner skin 7 and has the same radial thickness as said inner skin.

In this example, the tangential step 10 projects tangentially over a length of 10 mm and has a radial thickness of approximately 1 to 2 mm. In this example, the tangential step 10 extends over the entire length of the longitudinal slot 8.

To produce the acoustic panel 5 with its tangential step 10, cuts are preferably made in a circumferential acoustic panel which is formed in one piece. A first cut is made along an axial plane so as to form the longitudinal slot 8. After the first cut has been made, the two ends 5A, 5B of the acoustic panel 5 are planar.

A second cut is then made so as to remove a portion L from the outer layer 6 of the second end 5B without affecting the inner skin 7. After the portion L has been removed from the outer layer 6, the inner skin 7 remains projecting tangentially and forms the tangential step 10 described above. In this example, a portion L of approximately 10 mm is removed from the outer layer 6 of the second end 5B of the acoustic panel 5. Preferably, the length of the portion L is produced in such a way as to cut out a whole number of recesses in the outer layer 6 of the acoustic panel 5. In this example, a portion L corresponds to the length of two recesses which have been cut out in the outer layer 6. After the cuts are made, the outer layers 6 of the ends 5A, 5B are separated by the longitudinal slot 8.

A method of this type for producing an acoustic panel 5 is simple to carry out and allows the inner skin 7 to be continuous when it is mounted in the fan casing 1. The acoustic panel 5 is obtained from a circumferential panel which is formed in one piece and is perfectly adapted to the dimensions of the fan casing 1 without any portion of the inner skin 7 having to be removed.

An embodiment of the method for mounting the acoustic panel 5 will now be described.

Figure 1:
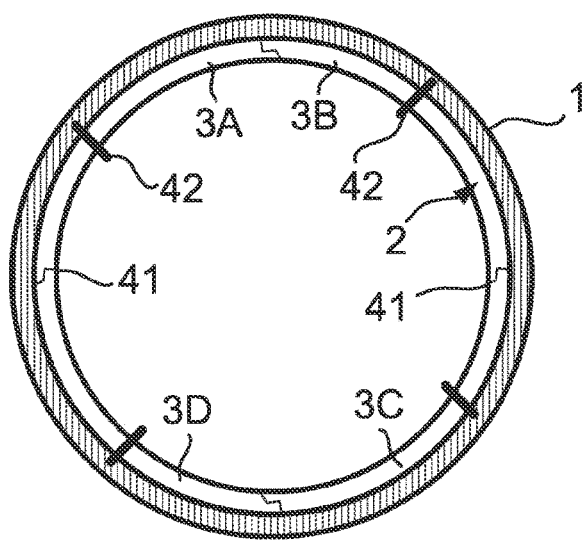
FIG. 1 is a cross-sectional schematic view of a fan casing in which an acoustic panel according to the prior art is mounted.
Figure 2:
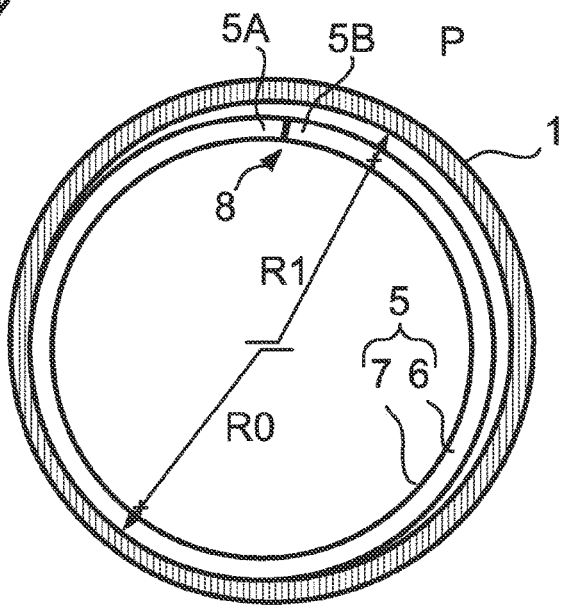
FIG. 2 is a cross-sectional schematic view of a fan casing in which an acoustic panel according to the invention is mounted when the opposing ends are close together during mounting.

With reference to FIG. 2, the method comprises a step of bringing the opposing ends 5A, 5B closer together so as to decrease the cylinder radius of the acoustic panel 5. During this step and with reference to FIG. 5, the first end 5A of the acoustic panel 5 extends outwardly towards the tangential step 10 and, preferably, the outer layers 6 of the ends 5A, 5B are in contact with each other so as to reduce the transverse size of the acoustic panel 5 as much as possible. In other words, the inner skin 7 of the first end 5A is radially placed on top of the inner skin 7 of the second end 5B.

With reference to FIG. 2, during this step of bringing the opposing ends 5A, 5B closer together, the radius R1 of the acoustic panel 5 when the opposing ends are opened out is reduced by a value ΔR until the radius reaches a value of R0 when the opposing ends are close together. The value ΔR constitutes the assembly clearance. In order to establish the value of the assembly clearance ΔR, it is sufficient to adjust the length L of the portion of the outer layer 6 to be removed from the second end 5B. The assembly clearance ΔR depends on the length L as follows:

$$\Delta R = \frac{L}{2\pi}$$

Due to the assembly clearance ΔR, the acoustic panel 5 is inserted into the fan casing 1 without coming into contact with the inner surface of the fan casing 1 as shown in FIG. 2.

With reference to FIG. 3, the method comprises a step of opening out the opposing ends 5A, 5B so as to increase the cylinder radius of the acoustic panel 5 so that its outer surface fits with the inner surface of the fan casing 1. During the process of opening out the opposing ends, the inner skin 7 of the first end 5A is aligned with the inner skin 7 of the second end 5B, the cylinder radius of the acoustic panel 5 therefore being equal to R1. In other words, the inner skins 7 are an equal radial distance away from the axis of the turbine engine, thereby forming an acoustic panel 5 having an annular, continuous inner surface.

The method also comprises a step of attaching the acoustic panel 5 to the fan casing 1 by gluing. Some glue may be applied to the inner surface of the fan casing 1 and/or the outer surface of the acoustic panel 5. Furthermore, the glue may be applied before or after inserting the acoustic panel 5 into the fan casing 1. The use of glue means that there are no attachment means which are susceptible to vibration during operation of the turbine engine to generate noise.

Preferably, the method comprises a step of filling the slot 8 using sealing means 9 after the step of opening out the opposing ends. In this example, the sealing means 9 are in the form of an expanding foam but it goes without saying that other means could also be suitable. The step of filling the slot preferably takes place at the same time as the step of applying glue.

Figure 6:
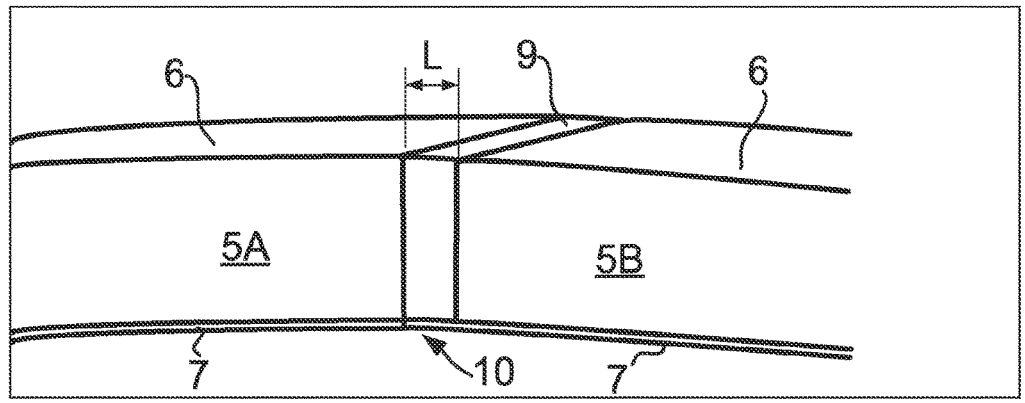
FIG. 6 is an enlarged schematic view of the ends of the acoustic panel when they are opened out.

As shown in FIG. 3 and FIG. 6, the expanding foam is placed radially between the tangential step 10 and the inner surface of the fan casing 1 so as to fill the portion L of the outer layer 6 which was removed by the second cut. Therefore, as shown in FIG. 6, the expanding foam is located between the outer layers 6 of the ends 5A, 5B of the acoustic panel 5.

The length of the portion L of the outer layer 6 for forming the longitudinal slot 8 results in a compromise being made, on the one hand, between the acoustic efficiency which requires the longitudinal slot 8 to be of a reduced length and, on the other hand, between the ease of mounting the acoustic panel 5.

The invention has been described for a circumferential, cylindrical acoustic panel which is formed in one piece but the invention can also be applied to an acoustic panel which comprises a plurality of interconnected acoustic modules, each acoustic module forming a cylindrical angular sector of the acoustic panel. Each angular sector is compact in size, which makes it easier for it to be mounted in the casing of the turbine engine. Each angular sector comprises linking means which allow it to cooperate with an adjacent angular sector.

The invention has been described for a fan casing but the invention can equally be applied to any turbine engine casing, such as an exhaust casing.

The invention claimed is:

1. Method for mounting a cylindrical acoustic panel on the inner surface of an annular casing of an axial turbine engine, the cylindrical acoustic panel comprising at least one longitudinal slot so as to define two opposing ends, the method comprising:
    bringing the opposing ends closer together so as to decrease the cylinder radius of the acoustic panel;
    inserting the acoustic panel into the fan casing when the opposing ends are close together;
    opening out the opposing ends so as to increase the cylinder radius of the acoustic panel; and
    attaching the acoustic panel to the casing by gluing.

2. Method according to claim 1, comprising filling the slot using sealing means after the step of opening out the opposing ends.

3. Method according to claim 1, wherein a second end of the acoustic panel comprises a tangential step, the first end of the acoustic panel extending outwardly towards said tangential step when the opposing ends are close together.

4. Method according to claim 1, wherein the acoustic panel comprises an outer layer which is composed of a honeycomb structure and an inner skin, the outer layers of the opposing ends of the acoustic panel being in contact with each other when the opposing ends are close together.

5. Assembly of a casing of an axial turbine engine and of an acoustic panel which is glued to the inner surface of said casing, the acoustic panel comprising at least one longitudinal slot so as to define two opposing ends and comprising means of sealing the longitudinal slot, wherein a second end of the acoustic panel comprises a tangential step, the sealing means being arranged radially between said step and the inner surface of the casing.

6. Assembly according to claim 5, wherein the acoustic panel comprises an outer layer which is composed of a honeycomb structure and an inner skin, the tangential step being formed in the inner skin.

7. Assembly according to claim 5, wherein the radial thickness of the tangential step is approximately 1 mm to 2 mm.

8. Assembly according to claim 5, wherein the acoustic panel is an annular part.

9. Assembly according to claim 5, wherein the sealing means are in the form of an expanding foam.

* * * * *